United States Patent
Hendrickson et al.

(10) Patent No.: US 8,231,504 B2
(45) Date of Patent: Jul. 31, 2012

(54) POWERTRAIN WITH DUAL ROTOR MOTOR/GENERATOR

(75) Inventors: James D. Hendrickson, Oxford, MI (US); Brendan M. Conlon, Rochester Hills, MI (US); Khwaja M. Rahman, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 674 days.

(21) Appl. No.: 12/371,653

(22) Filed: Feb. 16, 2009

(65) Prior Publication Data

US 2010/0207471 A1     Aug. 19, 2010

(51) Int. Cl.
    *B60W 10/02*     (2006.01)
    *B60W 20/00*     (2006.01)

(52) U.S. Cl. ............... 477/5; 180/65.22; 180/65.265

(58) Field of Classification Search ........... 477/5, 8; 310/100, 156.37; 180/65.21, 65.265, 65.275, 180/65.28, 65.285, 65.29, 65.31, 65.51
See application file for complete search history.

(56) References Cited

U.S. PATENT DOCUMENTS

| | | | | |
|---|---|---|---|---|
| 4,533,011 A * | 8/1985 | Heidemeyer et al. | ...... | 180/65.25 |
| 5,804,935 A * | 9/1998 | Radev | .......... | 318/139 |
| 5,903,113 A * | 5/1999 | Yamada et al. | ........ | 318/10 |
| 5,931,757 A * | 8/1999 | Schmidt | ............. | 475/2 |
| 5,934,396 A * | 8/1999 | Kurita | ............. | 180/65.25 |
| 6,005,358 A * | 12/1999 | Radev | ............. | 318/139 |
| 6,098,735 A * | 8/2000 | Sadarangani et al. | ..... | 180/65.24 |
| 6,149,544 A * | 11/2000 | Masberg et al. | ........ | 477/13 |
| 6,501,190 B1 * | 12/2002 | Seguchi et al. | ........ | 290/46 |
| 6,585,066 B1 * | 7/2003 | Koneda et al. | ......... | 180/65.25 |
| 6,656,082 B1 * | 12/2003 | Yamada et al. | ........ | 477/5 |
| 6,710,492 B2 * | 3/2004 | Minagawa | ............ | 310/113 |
| 6,910,981 B2 * | 6/2005 | Minagawa et al. | ........ | 475/5 |
| 7,063,637 B2 * | 6/2006 | Yamauchi et al. | ........ | 475/5 |
| 7,240,751 B2 * | 7/2007 | Hoare et al. | ............ | 180/65.25 |
| 7,497,285 B1 * | 3/2009 | Radev | ............. | 180/65.225 |
| 7,652,388 B2 * | 1/2010 | Lyatkher | ............. | 290/53 |
| 7,891,449 B2 * | 2/2011 | Sanji | ............. | 180/65.235 |
| 7,936,076 B2 * | 5/2011 | Hsu | ............. | 290/1 A |
| 7,973,422 B2 * | 7/2011 | Colin et al. | ........ | 290/52 |
| 2001/0008354 A1 * | 7/2001 | Minagawa | ............ | 310/113 |

(Continued)

OTHER PUBLICATIONS

Patrick M. Kelecy and Robert D. Lorenz "Control Methodology for Single Stator, Dual-Rotor Induction Motor Drives for Electric Vehicles", Institute of Electrical and Electronics Engineers Paper No. 0-7803-2730-6/95; Jun. 199; pp. 572-578.

*Primary Examiner* — John R Olszewski
*Assistant Examiner* — Jacob Meyer
(74) *Attorney, Agent, or Firm* — Quinn Law Group, PLLC

(57) ABSTRACT

A powertrain is provided that includes an engine as well as a transmission having an input member and an output member. The powertrain also includes a motor/generator that has an energizable stator, a first rotor and a second rotor (i.e., a dual rotor motor). Both of the rotors are rotatable via energization of the stator. A first torque-transmitting mechanism, referred to as the engine clutch, is selectively engagable to connect the engine for common rotation with one of the first and the second rotors. A second torque-transmitting mechanism, referred to as the motor clutch, is selectively engagable to connect the first rotor for common rotation with the second rotor. The transmission input member is continuously connected for common rotation with the other of the first and second rotors.

9 Claims, 1 Drawing Sheet

U.S. PATENT DOCUMENTS

| | | | |
|---|---|---|---|
| 2002/0100624 A1* | 8/2002 | Joong et al. | 180/65.4 |
| 2002/0117926 A1* | 8/2002 | Joong et al. | 310/191 |
| 2002/0117927 A1* | 8/2002 | Kim et al. | 310/191 |
| 2002/0117933 A1* | 8/2002 | Joong et al. | 310/261 |
| 2003/0019674 A1* | 1/2003 | Duan | 180/65.3 |
| 2003/0073534 A1* | 4/2003 | Oshidari et al. | 475/5 |
| 2004/0021390 A1* | 2/2004 | Kim et al. | 310/191 |
| 2004/0124021 A1* | 7/2004 | Shirai et al. | 180/65.2 |
| 2006/0175103 A1* | 8/2006 | Iida et al. | 180/65.4 |
| 2006/0249319 A1* | 11/2006 | Hoare et al. | 180/65.4 |
| 2008/0011529 A1 | 1/2008 | Hoher et al. | |
| 2008/0173486 A1* | 7/2008 | Hsu | 180/65.2 |

* cited by examiner

POWERTRAIN WITH DUAL ROTOR MOTOR/GENERATOR

TECHNICAL FIELD

The invention relates to a transmission with a dual rotor motor/generator.

BACKGROUND OF THE INVENTION

One type of hybrid transmission is a transmission that may be powered by an engine as well as an electric motor/generator connected with an energy storage device. A key goal in designing a hybrid powertrain is to enable high operating efficiency over various operating modes to meet a wide variety of vehicle operating conditions. Often, an electric-only operating mode (i.e., wherein the vehicle is powered only by the motor) and an engine-only operating mode are provided. A hybrid operating mode, in which both the engine and the motor add power, may also be provided. Efficiencies in conducting the various operating modes to best meet vehicle power demands while maintaining smooth transitions between modes are desired.

SUMMARY OF THE INVENTION

A powertrain is provided that includes an engine as well as a transmission having an input member and an output member. The powertrain also includes a motor/generator that has an energizable stator, a first rotor and a second rotor (i.e., a dual rotor motor). Both of the rotors are rotatable via energization of the stator. A first torque-transmitting mechanism, referred to as the engine clutch, is selectively engagable to connect the engine for common rotation with one of the first and the second rotors. A second torque-transmitting mechanism, referred to as the motor clutch, is selectively engagable to connect the first rotor for common rotation with the second rotor. The transmission input member is continuously connected for common rotation with the other of the first and second rotors.

In some embodiments, the first rotor is radially outward of the stator and the second rotor is radially inward of the stator. The engine clutch may be selectively engagable to the first rotor in some such embodiments, and to the second rotor in other embodiments. In another embodiment, the rotors are arranged axially adjacent the stator so that the rotors and the stator are coaxial with a centerline of rotation of the rotors, and the rotors are not concentric with one another. In that embodiment, the engine clutch is selectively engagable to connect the engine for common rotation with the first rotor.

The powertrain may be controlled to provide an electric vehicle operating mode suitable for high torque levels, an electric vehicle operating mode suitable for lower torque levels, an engine start mode, an electric torque converter mode (i.e., a mode in which one of the rotors generates electricity in the stator by rotating faster than the stator, and the energized stator then drives the other rotor, with the rotors therefore "slipping" with respect to the stator and with respect to one another, similar to a torque converter), an electric assist mode and a regenerative braking mode. The powertrain ensures good vehicle launch quality by eliminating the need to control a friction clutch at low slip speeds, by instead applying the engine clutch at a near synchronous speed. The electric-only operating mode requires no clutch engagements, thereby improving system efficiency by reducing heat generation. For high torque applications, the engine can be used as the primary mover, to reduce dependency on battery capacity.

Preferably, a single set of power electronics, including a battery, a power inverter and a controller, are used to power the stator. The transmission may be a mechanical transmission without any additional motor/generators (i.e., a transmission with gear sets and torque-transmitting mechanisms operable to establish a fixed speed ratio between the transmission input member and the transmission output member). Thus, by reducing components and potentially integrating the dual rotor motor with a conventional (i.e., non-hybrid) transmission, overall cost may be reduced.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
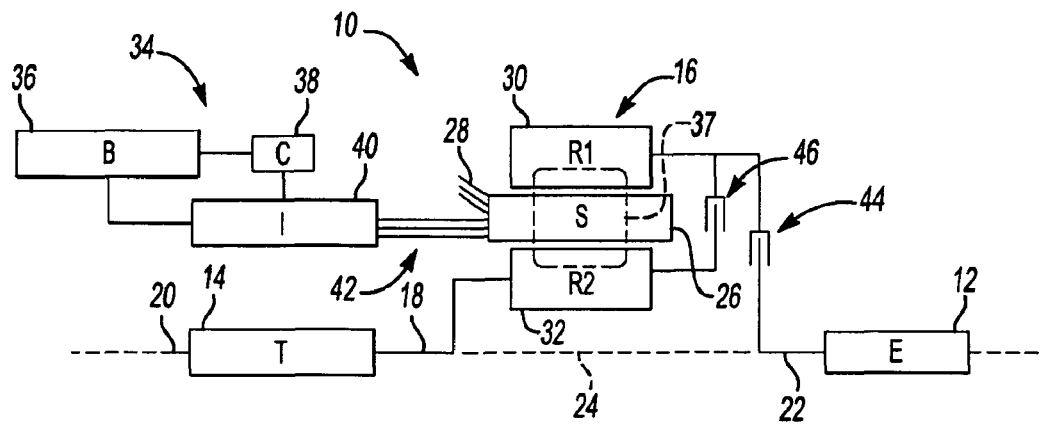
FIG. 1 is a schematic illustration of a first embodiment of a powertrain.

Referring to the drawings, wherein like reference numbers refer to like components throughout the several views, FIG. 1 shows a powertrain 10 with an engine 12, a transmission 14 and a motor/generator 16 operatively connected therebetween. The engine 12 is any type of internal combustion engine, such as a gasoline or diesel engine. The transmission 14 is a conventional mechanical transmission. That is, it includes a plurality of gears and selectively engagable torque-transmitting mechanisms that are controllable to provide multiple fixed speed ratios between an input member 18 and a transmission output member 20, and does not include any motor/generators.

In the embodiment of FIG. 1, an engine output member 22 is coaxial with the transmission input member 18 and the transmission output member 20, establishing a common axis of rotation 24. The motor/generator 16 is positioned between the engine 12 and transmission 14. The motor/generator 16 includes a stator 26 grounded to a stationary member 28 such as a motor housing. A first rotor 30 and a second rotor 32 are positioned concentric with one another and adjacent the stator 26. The first rotor 30 is radially outward of the stator 26 and the second rotor 32 is radially inward of the stator. The stator 26, and rotors 30, 32 are annular and are positioned concentrically about the axis of rotation 24. Only a portion of the rotors 30, 32 and stator 26 are shown in FIG. 1, representing a cross-section taken along the axis of rotation 24 without showing a mirror image portion of the rotors 30, 32 and stator 26 below the axis of rotation 24 as viewed in FIG. 1.

The stator 26 is operatively connected to power electronics 34 that include a battery 36, a controller 38 and an inverter 40. The controller 38 controls the inverter 40 and battery 36 in response to vehicle operating conditions relayed to the controller by sensors or the like to transfer electric power between the battery 36 and the stator 26 via the inverter 40. The inverter 40 is connected to the stator 26 via three phase motor wiring 42. As further discussed below, electric power stored in the battery 36 may be delivered to the stator 26 (i.e., the stator 26 may be energized by the battery 36), energizing the stator and creating a rotating stator field 37 illustrated in a dashed line, or the stator 26 may deliver generated electric power to the battery 36, converting torque of one or both rotors 30, 32 into stored electric power. Stator field 37 surrounds the stator 37 as illustrated in FIG. 1 and rotates about the axis of rotation 24.

A first torque-transmitting mechanism, referred to as an engine clutch 44, is selectively engagable to connect the engine output member 22 for common rotation with the first rotor 30. A second torque-transmitting mechanism, referred to as a motor clutch 46, is selectively engagable to connect the first rotor 30 for common rotation with the second rotor 32. Both the engine clutch 44 and the motor clutch 46 are controlled by the controller 38 (wiring connections between the controller 38 and the clutches 44, 46 are not shown for purposes of clarity in the drawing), or by a separate controller, to establish, along with the controlled stator 26, various operating modes of the powertrain 10, as described further below.

Figure 2:
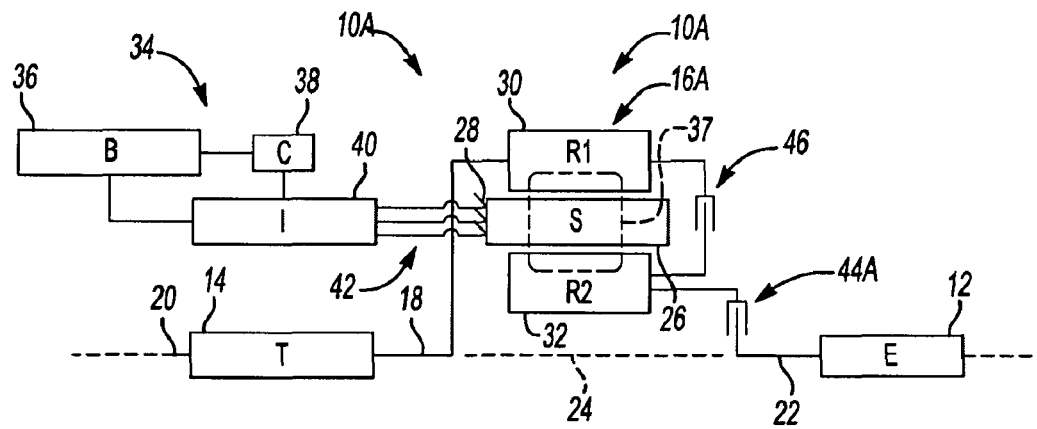
FIG. 2 is a schematic illustration of a second embodiment of a powertrain.

FIG. 2 illustrates a second embodiment of a powertrain 10A that is alike in every aspect and function as described with respect to powertrain 10 herein, with the exception that the motor/generator 16A and torque-transmitting mechanisms are arranged so that the first torque-transmitting mechanism, engine clutch 44A, is connected for common rotation with the second rotor 32, and the transmission input member 18 is connected for common rotation with the first rotor 30.

Figure 3:
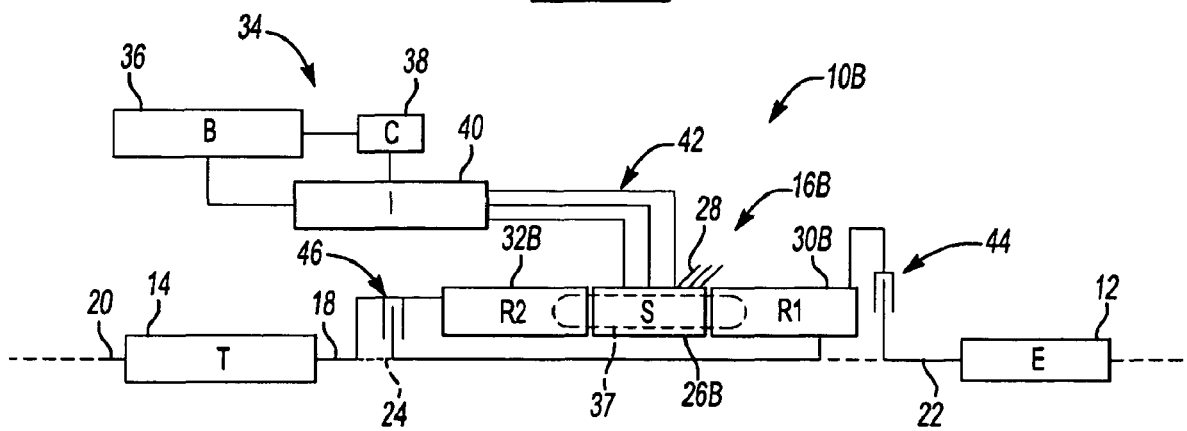
FIG. 3 is a schematic illustration of a third embodiment of a powertrain.

FIG. 3 illustrates a third embodiment of a powertrain 10B that is alike in every aspect and function as described with respect to powertrain 10 herein, with the exception that the motor/generator 16B has dual axial rotors 30B, 32B, placed axially adjacent stator 26B, rather than concentric rotors 30, 32.

Referring again to FIG. 1, the various operating modes of the powertrain are discussed herein. It should be understood that the powertrains 10A and 10B provide the same operating modes by utilizing the corresponding components in a like manner.

First, an electric vehicle operating mode appropriate for operating conditions in which relatively high torque is required at the transmission output member 20 is established when the engine clutch 44 is not engaged and the motor clutch 46 is engaged. This mode may occur whether or not the engine 12 is on or rotating. The controller 38 establishes electric power supply from the battery 36 to the stator 26 through the inverter 40 and motor wires 42 to establish a stator field 37 that rotates faster than both of the rotors 30, 32. Thus, the stator field 37 drives rotors 30, 32, which in turn provide torque at the transmission input member 18. Accordingly, a vehicle on which powertrain 10 is installed is propelled only by electric power during the electric vehicle mode.

An alternative electric vehicle operating mode appropriate for operating conditions in which moderate torque levels are required at the transmission output member 20 is established when neither of the clutches 44, 46 are engaged, and whether or not the engine is on or rotating. The controller 38 establishes electric power supply from the battery 36 to the stator 26 through the inverter 40 and motor wires 42 to establish a stator field 37 that rotates faster than rotor 32. Rotor 30 rotates substantially with the stator field 37 with minimal slippage (i.e., relative rotation) due to relatively light parasitic loads, as the rotor 30 is not connected with rotor 32 or with engine 12.

The powertrain 10 is also operable in an engine start mode, in which the engine clutch 44 and the motor clutch 46 begin in an open state (i.e., not engaged). Assuming the vehicle was being propelled by electric power in the electric vehicle mode, the stator field 37 continues to rotate, propelling the vehicle via rotor 32. The engine clutch 44 is then applied, causing rotor 30 to slow and engine 12 to speed up to an engine clutch synchronous point in which the engine output member 22 rotates at substantially the same speed as the rotor 32. Torque supplied via stored energy in the battery 36 drives rotor 30 and engine 12 until engine speed approaches the speed of the stator field 37. At this substantially synchronous speed, which can be sensed and relayed to the controller 38, motor clutch 46 is engaged, causing the engine 12 and the rotors 30, 32 to rotate at the same speed.

Further more, the powertrain 10 is operable in an electric torque converter mode, which may follow the engine start mode. In this mode, engine clutch 44 is engaged and motor clutch 46 is open. The engine 12 drives rotor 30 at a higher speed than the stator field 37, causing electricity to be generated in the stator turns (not shown on stator). The stator field rotates faster than rotor 32; thus the vehicle is propelled via the inner rotor 32. Accordingly, there is a slip between the input (speed of engine output member 22 and rotor 30) and the output (speed of rotor 32 and transmission input member 18), similar to slip in a fluid torque converter. Depending on the relative slip speed of the stator 26 and the two rotors 30, 32, any excess power may be used to charge the battery 36 by utilizing torque of one or both rotors 30, 32 to generate electricity, or battery power may be provided through inverter 40 to the stator 26 to assist in launch of a vehicle having powertrain 10.

An electric assist operating mode and a regenerative braking mode are provided when both clutches 44, 46 are engaged. The engine 12 propels the vehicle via the engine clutch 44, motor clutch 46 and rotor 32. If additional torque is desired, electric power is supplied by battery 36 to stator 26, and the speed of the stator field is faster than the speed of rotor 32. If regenerative braking is desired, power is diverted to the battery 36 from the stator 26 (i.e., the motor/generator is used to convert torque to electrical energy), and the stator field 37 rotates slower than the speed of the rotors 30, 32.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
an engine;
a transmission having an input member and an output member;
a motor/generator having an energizable stator, a first rotor and a second rotor both rotatable via energization of the stator;
a first torque-transmitting mechanism selectively engagable to connect the engine for common rotation with one of the first and the second rotors;
a second torque-transmitting mechanism selectively engagable to connect the first rotor for common rotation with the second rotor;
wherein the transmission input member is continuously connected for common rotation with the other of the first and second rotors;
wherein the rotors and the stator are concentric; wherein the first rotor is radially outward of the stator and the second rotor is radially inward of the stator;
a battery operatively connected to the stator; and
a controller operatively connected to the first torque-transmitting mechanism and to the battery and configured to engage only the first torque-transmitting mechanism when the engine is on and to direct stored energy from the battery sufficiently such that the first rotor generates a stator field of the stator and rotates relative to the stator field of the stator so that the stator field powers the second rotor to drive the transmission thereby establishing an electric torque converter operating mode.

2. The powertrain of claim 1, wherein the first torque-transmitting mechanism is selectively engagable to connect the engine for common rotation with the first rotor.

3. The powertrain of claim 1; wherein the controller is operatively connected to the second torque-transmitting mechanism; wherein the controller is configured to engage the second torque-transmitting mechanism and direct stored energy from the battery to energize the stator to cause rotation of the first and second rotors thereby establishing an electric vehicle operating mode.

4. The powertrain of claim 3, wherein the controller is configured to direct stored energy from the battery to the stator to cause the stator to produce a rotating stator field that rotates faster than both the first and the second rotors when torque applied to the transmission input member is relatively high, and that rotates faster than the second rotor connected for common rotation with the transmission input member when torque applied to the transmission input member is relatively low.

5. The powertrain of claim 3, wherein the controller is configured to engage the first torque-transmitting mechanism and subsequently engage the second torque-transmitting mechanism when speed of the first rotor is substantially the same as speed of a rotating stator field of the energized stator to cause the engine to start.

6. The powertrain of claim 1, wherein the controller is configured to engage both torque-transmitting mechanisms when the engine is on and direct stored energy from the battery to the stator to selectively add power to the second rotor and receive power from the second rotor to accomplish electric assist and regenerative braking modes, respectively.

7. A hybrid vehicle powertrain comprising:
an engine;
a mechanical, non-hybrid transmission having an input member;
a battery;
an inverter;
a controller operatively connected to the engine, the battery, and the inverter and operable to control power flow from and to the battery;
a motor/generator having:
a stator selectively powered by the battery through the inverter to create a stator field and selectively providing power to the battery through the inverter;
first and second rotors rotatable relative to one another in response to a stator field generated in the stator in response to powering by the battery;
an engine clutch selectively engagable to connect the engine for common rotation with one of the rotors; and
a second torque-transmitting mechanism selectively engagable to connect the rotors for common rotation with one another; wherein the controller is operatively connected to the engine clutch and the second torque-transmitting mechanism to control selective engagement of the engine clutch and the second torque-transmitting mechanism; and wherein the controller is configured to control the battery, the engine clutch and the second torque-transmitting mechanism to establish an electric-only operating mode, an engine start mode, an electric torque converter mode, an electric assist mode and a regenerative braking mode based on vehicle operating conditions.

8. A hybrid powertrain comprising:
an engine;
a transmission having an input member and characterized by an absence of any motor/generators;
a motor/generator having a single stator and dual rotors rotatable by the stator;
wherein the motor/generator is positioned between and operatively connectable with the engine and the transmission input member;
only two torque-transmitting mechanisms including:
a first torque-transmitting mechanism selectively engagable to connect the engine for common rotation with one of the first and the second rotors; and
a second torque-transmitting mechanism selectively engagable to connect the first rotor for common rotation with the second rotor;
wherein the rotors and the stator are concentric; and wherein the first rotor is radially outward of the stator and the second rotor is radially inward of the stator.

9. The powertrain of claim 8, wherein the first torque-transmitting mechanism is selectively engagable to connect the engine for common rotation with the first rotor.

* * * * *